(12) United States Patent
Lun et al.

(10) Patent No.: US 11,585,407 B2
(45) Date of Patent: Feb. 21, 2023

(54) ROTARY DAMPER ASSEMBLY

(71) Applicant: BeijingWest Industries Co., Ltd., Beijing (CN)

(72) Inventors: Saiman Lun, Centerville, OH (US); Glen Spehr, Vandalia, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 100 days.

(21) Appl. No.: 17/142,967

(22) Filed: Jan. 6, 2021

(65) Prior Publication Data

US 2021/0215227 A1 Jul. 15, 2021

Related U.S. Application Data

(60) Provisional application No. 62/959,134, filed on Jan. 9, 2020.

(30) Foreign Application Priority Data

Dec. 21, 2020 (CN) .......................... 202011518230.9

(51) Int. Cl.
*F16F 15/18* (2006.01)
*F16F 9/53* (2006.01)

(52) U.S. Cl.
CPC .............. *F16F 15/18* (2013.01); *F16F 9/537* (2013.01); *F16F 2222/06* (2013.01); *F16F 2224/045* (2013.01)

(58) Field of Classification Search
CPC ........ F16F 15/18; F16F 9/537; F16F 2222/06; F16F 2224/045

(Continued)

(56) References Cited

U.S. PATENT DOCUMENTS 4,065,739 A 12/1977 Jaffe et al.
6,095,295 A 8/2000 Park et al.
(Continued)

FOREIGN PATENT DOCUMENTS

CN 1587738 A 3/2005
CN 105492797 A 4/2016
(Continued)

OTHER PUBLICATIONS

Extended European Search Report dated Jun. 16, 2021 for counterpart European patent application No. 21150509.4.

(Continued)

*Primary Examiner* — Xuan Lan Nguyen
(74) *Attorney, Agent, or Firm* — William H. Honaker; Dickinson Wright PLLC (57) ABSTRACT

A rotary damper assembly comprises a housing extending along a center axis. The housing includes an upper portion and a lower portion. The lower portion defines a fluid chamber. The upper portion defines a compartment in communication with the fluid chamber. The magnetic field generator includes a magnetic core located between the upper portion and the lower portion. The magnetic core extends along the center axis between the upper portion and the lower portion. At least one coil extends about the magnetic core. A shaft extends along the center axis through the upper portion and the magnetic core and into the fluid chamber to facilitate magnetorheological fluid flow from the compartment to the fluid chamber. The magnetic field generator includes an insert, containing a permanent magnetic material, for generating a permanent magnetic field to change viscosity of the magnetorheological fluid.

18 Claims, 4 Drawing Sheets

(58) Field of Classification Search
USPC .................................................. 188/267.2
See application file for complete search history.

(56) References Cited

U.S. PATENT DOCUMENTS

| | | | |
|---|---|---|---|
| 6,131,709 A | 10/2000 | Jolly et al. | |
| 6,279,702 B1 | 8/2001 | Koh | |
| 6,318,522 B1 | 11/2001 | Johnston et al. | |
| 6,378,671 B1 | 4/2002 | Carlson | |
| 6,419,057 B1 | 7/2002 | Oliver et al. | |
| 8,393,446 B2 | 3/2013 | Haugen | |
| 8,424,656 B2 * | 4/2013 | Hiemenz | F16F 9/3415 188/267.2 |
| 8,955,653 B2 | 2/2015 | Marking | |
| 9,109,654 B2 * | 8/2015 | Hiemenz | B60N 2/501 |
| 2010/0193304 A1 | 8/2010 | Bose et al. | |
| 2014/0152066 A1 | 6/2014 | Hiemenz | |
| 2014/0339029 A1 * | 11/2014 | Ido | F16D 37/02 252/62.51 R |
| 2015/0345134 A1 | 12/2015 | Takahashi et al. | |
| 2018/0320749 A1 * | 11/2018 | Takahashi | F16F 9/12 |
| 2019/0154108 A1 * | 5/2019 | Inoue | B60K 5/1208 |

FOREIGN PATENT DOCUMENTS

| | | |
|---|---|---|
| CN | 107575524 A | 1/2018 |
| DE | 102015104927 A1 | 10/2016 |
| DE | 102017103809 A1 | 8/2018 |

OTHER PUBLICATIONS

First Office Action and search report dated Mar. 29, 2022 for counterpart Chinese patent application No. 202011518230.9, along with machine EN translation downloaded from EPO.

\* cited by examiner

ROTARY DAMPER ASSEMBLY

CROSS REFERENCE TO RELATED APPLICATION

The present application claims the benefit of U.S. Provisional Application Patent Ser. No. 62/959,134, filed on Jan. 9, 2020, and Chinese Patent Application No. 202011518230.9 filed on Dec. 21, 2020, the entire disclosures of which are hereby incorporated herein by reference.

BACKGROUND OF THE INVENTION

1. Field of the Invention

The present invention relates generally to a rotary damper assembly.

2. Description of the Prior Art

Rotary dampers assemblies are known in the art. Development of a semi-active rotary damper has been considerably advance. The semi-active rotary damper uses a working fluid, e.g. an electrorheological fluid or a magnetorheological fluid whose properties are changed by changing intensity of an electric or magnetic field.

When the electrorheological or magnetorheological fluid is subject to an electric or magnetic field, particles contained in the fluid are connected to form chains resulting in that the fluid is changed from a liquid phase to a gel phase, i.e. an increase in the viscosity of the fluid. In non-electric/magnetic field, the fluid acts as a Newtonian fluid whose shearing stress is proportional to strain rate. In an electric or magnetic field, however, the fluid acts as a Bingham fluid whose initial stress without strain is equal to a yielding stress because particles scattered in the fluid is rearranged to form chains.

One such a semi-active rotary damper is disclosed in U.S. Pat. No. 6,095,295. The semi-active rotary damper comprises a housing extending along a center axis. The housing including an upper portion and a lower portion. The lower portion defines a fluid chamber. The upper portion defines a compartment in communication with the fluid chamber. A magnetic field generator is sandwiched between the upper portion and the lower portion for generating a magnetic field. The magnetic field generator includes an outer body extending about the center axis. The outer body defines a hole in fluid communication with the compartment and the fluid chamber. The magnetic field generator includes a magnetic core extending along the center axis between the upper portion and the lower portion. At least one coil extends about the magnetic core for generating the magnetic field. A shaft extends along the center axis through the upper portion and the magnetic core and into the fluid chamber of the lower portion.

As the magnetorheological fluid moves in the rotary damper assembly, the temperature of the magnetorheological fluid increases which can cause the volume of magnetorheological fluid to expand. Accordingly, due to the expansion of the magnetorheolgocial fluid, cavitation occurs which reduces the operation life of the rotary damper assembly.

SUMMARY OF THE INVENTION

The present invention in its broadest aspect provides a rotary damper assembly having an increased damping level. The present invention also provides a rotary damper assembly having a backup mode of operation in response to a power outage or a system failure. The present invention further provides a rotary damper assembly that is able to accommodate for expansion of the magnetorheological fluid thereby reduces cavitation and improves the operation life of the rotary damper.

It is one aspect of the present invention to provide a rotary damper assembly. The rotary damper assembly comprises a housing extending along a center axis. The housing includes an upper portion and a lower portion. The lower portion defines a fluid chamber for containing a magnetorheological fluid. The upper portion defines a compartment in communication with the fluid chamber. The magnetic field generator includes a magnetic core located between the upper portion and the lower portion. The magnetic core extends along the center axis between the upper portion and the lower portion. At least one coil extends about the magnetic core. A shaft extends along the center axis through the upper portion and the magnetic core and into the fluid chamber to facilitate magnetorheological fluid flow from the compartment to the fluid chamber. The magnetic field generator includes an insert, containing a permanent magnetic material, for generating a permanent magnetic field to change viscosity of the magnetorheological fluid. By combining the flux density generated by the at least one coil and the flux density of the insert during operation, the rotary damper assembly is able to increase the damping level of the rotary damper assembly. Additionally, by including the insert, the rotary damper assembly is able to provide a continuous magnetic flux, i.e. a backup mode, in response to a power outage or a system failure.

It is another aspect of the present invention to provide a rotary damper assembly. The rotary damper comprises a housing extending along a center axis. The housing includes an upper portion and a lower portion. The lower portion defines a fluid chamber for containing a magnetorheological fluid. The upper portion defines a compartment in communication with the fluid chamber. A magnetic field generator includes a magnetic core located between the upper portion and the lower portion. The magnetic core extends along the center axis between the upper portion and the lower portion. At least one coil extends about the magnetic core. A shaft extends along the center axis through the upper portion and the magnetic core and into the fluid chamber to facilitate magnetorheological fluid flow from the compartment to the fluid chamber. A gas cup located in the fluid chamber dividing the fluid chamber into an upper chamber and a lower chamber to accommodate for the expansion of the magnetorheological fluid.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
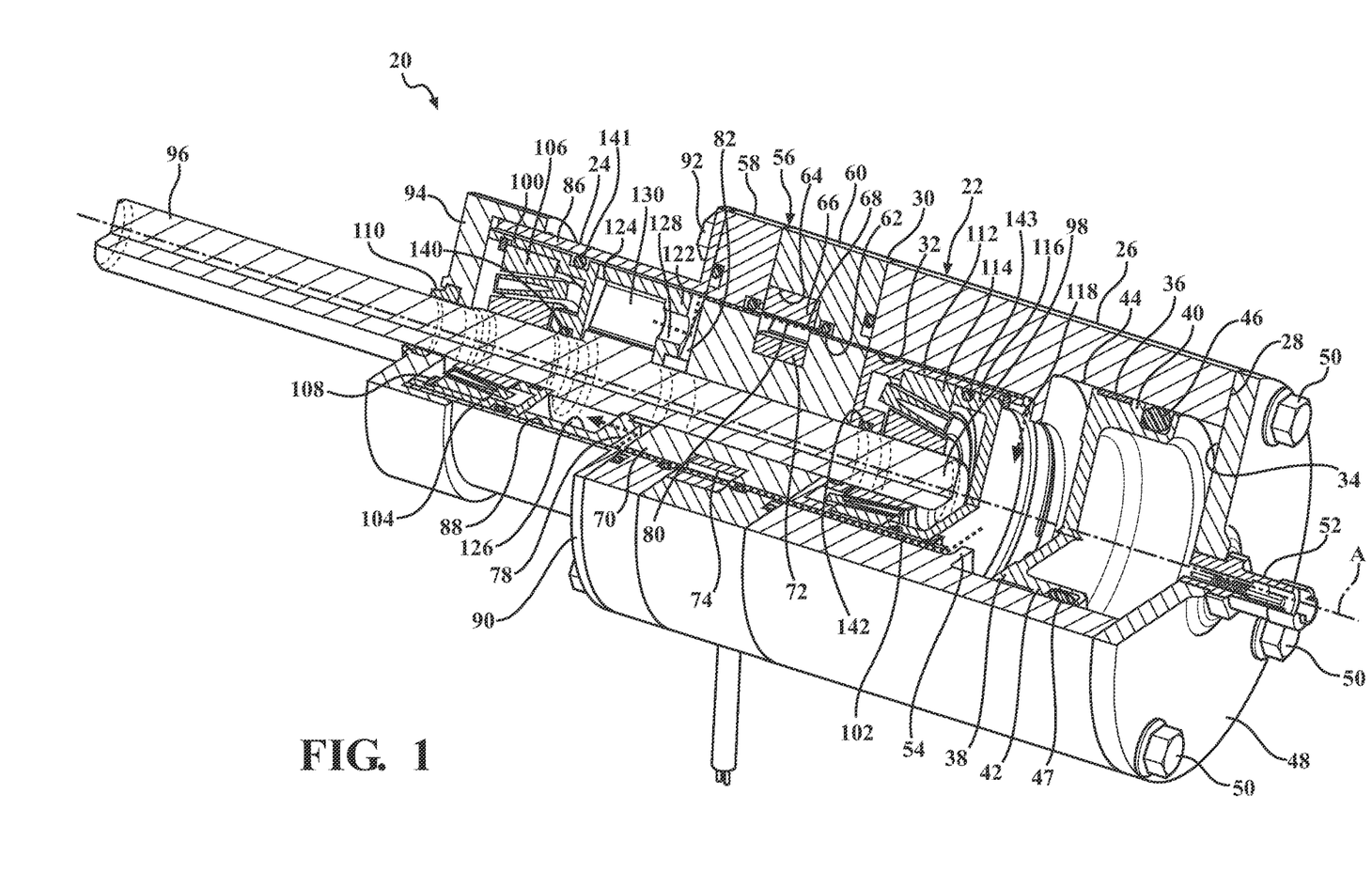
FIG. 1 is a cross-sectional perspective view of a rotary damper assembly constructed in accordance with one embodiment of the present invention.

Referring to the Figures, wherein like numerals indicate corresponding parts throughout the several views, a rotary damper assembly 20 constructed in accordance with one embodiment of the present invention is generally shown in FIG. 1.

Figure 2:
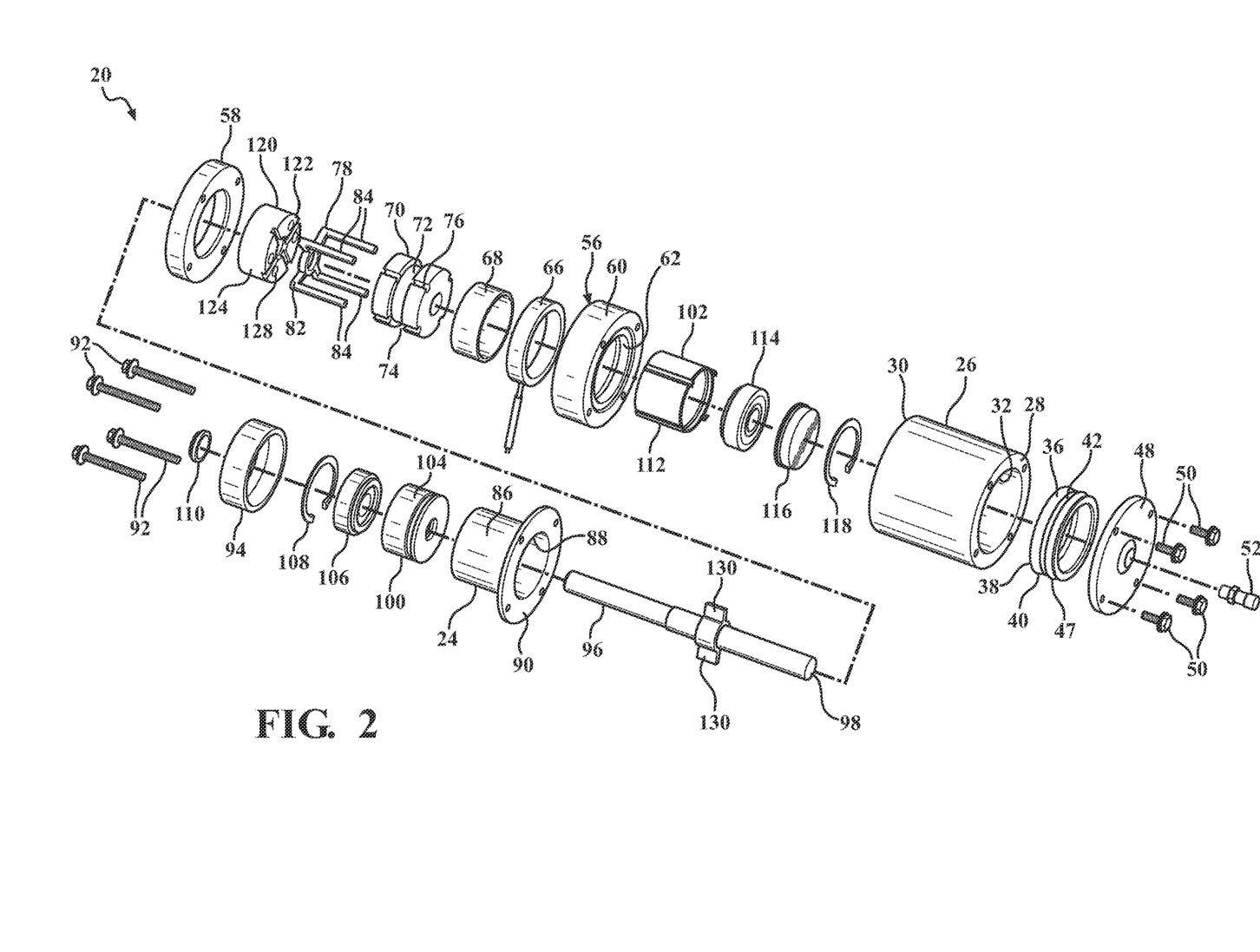
FIG. 2 is a exploded view of the rotary damper assembly.

As best illustrated in FIGS. 1 and 2, the rotary damper assembly 20 comprises a housing 22, having a generally cylindrical shape, extending along a center axis A. The housing 22 includes an upper portion 24 and a lower portion 26 axially spaced apart from one another. The lower portion 26, having a generally cylindrical shape, extends along the center axis A between a first end 28 and a second end 30. The lower portion 26 defines a fluid chamber 32, 34 extending between the first end 28 and the second end 30 for containing a magnetorheological fluid. The magnetorheological fluid, as known in the art, is responsive to modify its shear properties. More specifically, in response to a magnetic field applied to the magnetorheological fluid, the magnetorheological fluid has the ability to modify its shear property from a free flowing or a viscous liquid to a semi-solid with controllable yield strength.

A gas cup 36, having a generally cylindrical shape, is slidably disposed in fluid chamber 32, 34 dividing the fluid chamber into an upper chamber 32 and a lower chamber 34. The upper chamber 32 extends between the gas cup 36 and the second end 30. The lower chamber 34 extends between the gas cup 36 and the first end 28. The gas cup 36 includes a top 38 and a bottom 40. The top 38, having a generally circular shape, is disposed on the center axis A in the lower chamber 34. The bottom 40, having a generally tubular shape, extends outwardly from the top 38 and annularly about the center axis A toward the first end 28 of the lower portion 26 of the housing 22. The bottom 40 includes an exterior surface 42, facing an inner surface 44 of the lower portion 26 of the housing 22. The exterior surface 42 extends annularly about the center axis A and defines a groove 46 extending about the bottom for receiving an O-ring 47, located in the groove 46, in engagement with the inner surface 44 of the lower portion 26 of the housing 22.

An end plate 48, having a generally circular shape, couples to the first end 28 of the lower portion 26 of the housing 22. A plurality of fasteners 50, disposed about the center axis A, extends through the end plate 48 and coupled to the lower portion 26 of the housing 22 to secure the end plate 48 to the first end 28 of the lower portion 26 of the housing 22. A charge valve 52, located on the end plate 48, extending outwardly from the end plate 48 and along the center axis A, for allowing a user to introduce a gas into the lower chamber 34 between the gas cup 36 and the end plate 48 to provide an additional damping force. A projection 54, located in the upper chamber 32 of the fluid chamber 32, 34, extends radially inwardly from the inner surface 44 of the lower portion 26 for engaging the gas cup 36 and limit the axial movement of the gas cup 36 in the fluid chamber 32, 34. By introducing the gas into the lower chamber 34, the gas becomes pressurized between the gas cup 36 and the end plate 48. Due to the formation of the pressurized gas in the lower chamber 34, the gas cup 36 and the pressurized gas are able to provide an additional damping force in response to a movement of the magnetorheological fluid inside the fluid chamber 32, 34. As the magnetorheological fluid moves in the rotary damper assembly 20, the temperature of the magnetorheological fluid increases which can cause the volume of magnetorheological fluid to expand. Accordingly, the pressurized gas and the gas cup 36 are able to accommodate for the expansion of the magnetorheological fluid thereby preventing cavitation caused by the magnetorheological fluid expansion.

A magnetic field generator 56, having a generally cylindrical shape, couples to the second end 30 of the lower portion 26 of the housing 22. The magnetic field generator 56 generates a magnetic field/magnetic flux for changing the magnetorheological fluid to provide various damping forces based on the viscosity of the magnetorheological fluid. The magnetic field generator 56 includes an outer body 58, 60 having an upper ring 58 and a lower ring 60. The upper ring 58, having a generally circular shape, is disposed in an abutment relationship with the upper portion 24 of the housing 22. The lower ring 60, having a generally circular shape, is disposed in an abutment relationship with the second end 30 of the lower portion 26 of the housing 22. The magnetic field generator 56 defines a hole 62, having a generally cylindrical shape, extending along the center axis A and in communication with the upper chamber 32 of the lower portion 26 of the housing 22.

The lower ring 60 defines a groove 64, located adjacent to the upper ring 58, in communication with the hole 62 and extending annularly about the center axis A. At least one coil 66, located in the groove 64, extends annularly about the center axis A and in electrical communication with a power source (not shown) for generating the magnetic field. A coil cylinder 68, located in the groove 64, extends annularly about the center axis A coupled to the upper ring 58 and the lower ring 60 for securing the at least one coil 66 in the groove 64.

A magnetic core 70, having a generally cylindrical shape, is disposed in the hole 62 and radially spaced apart from the upper ring 58 and the lower ring 60. The magnetic field generator 56 includes an insert 72, containing a permanent magnetic material, for generating a permanent magnetic field for changing the viscosity of the magnetorheological fluid. The inclusion of the insert 72 increases the mode of operation of the rotary damper assembly 20. For example, according to an embodiment of the present invention, the inclusion of the insert 72 allows the rotary damper assembly 20 to operate between a soft mode and a hard mode. In the soft mode, a specific level of current can be applied to the at least one coil 66 to counter act the magnetic flux of the insert 72. In other words, in the soft mode, the power source and the at least one coil 66 produces a counter magnetic flux to cancel the magnetic flux of the insert 72, thereby reduces the viscosity of the magnetorheological fluid and allow the magnetorheological fluid to flow more freely in the rotary damper assembly 20 to provide a "soft" damping feel. In the hard mode, a large amount of current can be supplied to the at least one coil 66. Accordingly, once a maximum current is reached, a controller switches the direction of electric current to combine the magnetic flux generated by the at least one coil 66 and the magnetic flux of the insert 72 thereby increasing the viscosity of the magnetorheological fluid to provide a "hard" damping feel.

Furthermore, the inclusion of the insert 72 provides a backup mode of operation in the event of a power outage or system failure. During the power outage or system failure, the electric current cannot be sent through the at least one coil 66 from the power source. Since an electrical magnetic flux cannot be generated using the at least one coil 66, the rotary damper assembly 20 can operate under a backup mode. In other words, instead of generating the electrical magnetic flux using the at least one coil 66, the rotary damper assembly 20 operates based on the magnetic flux generated by the insert 72, e.g. the permanent magnet, to vary the viscosity of the magnetorheological fluid and provide damping.

According to an embodiment of the present invention, the at least one coil 66 and the insert 72 are radially spaced apart from one another. The magnetic core 70 defines a recess 74 for receiving the insert 72. According to an embodiment of the present invention, the recess 74 extends annularly about the center axis A. The insert 72, received in the recess 74, extends annularly about the center axis A. According to another embodiment of the present invention, instead of extending annulary about the center axis A, the magnetic core 70 can define a plurality of recesses 74 located about the magnetic core 70 circumferentially spaced from one another. Accordingly, an insert 72 can be received in each recess of the plurality of recesses 74. The magnetic core 70 also defines a plurality of channels 76, located about the magnetic core 70, circumferentially spaced from one another. Each channel 76 of the plurality of channels 76 extends along the magnetic core 70 in a perpendicular relationship with said recess 74.

A flow divider 78, located in the hole 62 and between and the magnetic core 70 and the outer body 58, 60, couples to the magnetic core 70 to define a plurality of passages 80, located about the center axis A, between the magnetic core 70 and the outer body 58, 60. The flow divider 78 includes a main body 82 and a plurality of protrusions 84. The main body 82 is located between the magnetic core 70 and the upper portion 24 of the housing 22. The plurality of protrusions 84 extends outwardly from the main body 82 wherein each protrusion 84 of the plurality of protrusions 84 is located in a channel 76 of the plurality of channels 76 extending along the center axis A to establish a plurality of passages 80 between the magnetic core 70 and the outer body 58, 60.

The upper portion 24 of the housing 22 includes a bushing 86, having a generally tubular shape and located adjacent to the magnetic field generator 56, extending about the center axis A. The upper portion 24 defines a compartment 88 extending along the center axis A. The bushing 86 includes a flange 90 extending radially outwardly from the bushing 86 in a perpendicular relationship with the center axis A. A plurality of bolts 92, disposed about the center axis A and circumferentially spaced from one another, extend through the flange 90 and and the magnetic field generator 56. The plurality of bolts 92 are in engagement with the second end 30 of the lower portion 26 of the housing 22 to secure the upper portion 24 of the housing 22 to the magnetic field generator 56 and the lower portion 26 of the housing 22. A cap 94, having a generally cylindrical shape and axially spaced apart from the flange 90, couples to the bushing 22 to close the compartment 88.

A shaft 96 extends along the center axis A and through the cap 94 to a distal end 98 located in the upper chamber 32 of the lower portion 26 of the housing 22. The distal end 98 is spaced apart from the gas cup 36. A pair of bearing members 100, 102, located in the housing 22, are disposed about the shaft 96 between the housing 22 and the shaft 96 to allow the shaft 96 to rotate relative to the housing 22. According to an embodiment of the present invention, the pair of bearing members 100, 102 include an upper bearing member 100 and a lower bearing member 102. The upper bearing member 100 is located in the compartment 88 of the upper portion 24 and adjacent to the cap 94. The upper bearing member 100 extends about the shaft 96 to provide support to the shaft 96. The lower bearing member 102 is located in the upper chamber 32 of the lower portion 26 of the housing 22. The lower bearing member 102 extends about the distal end 98 of the shaft 96 also providing support to the shaft 96.

Figure 3:
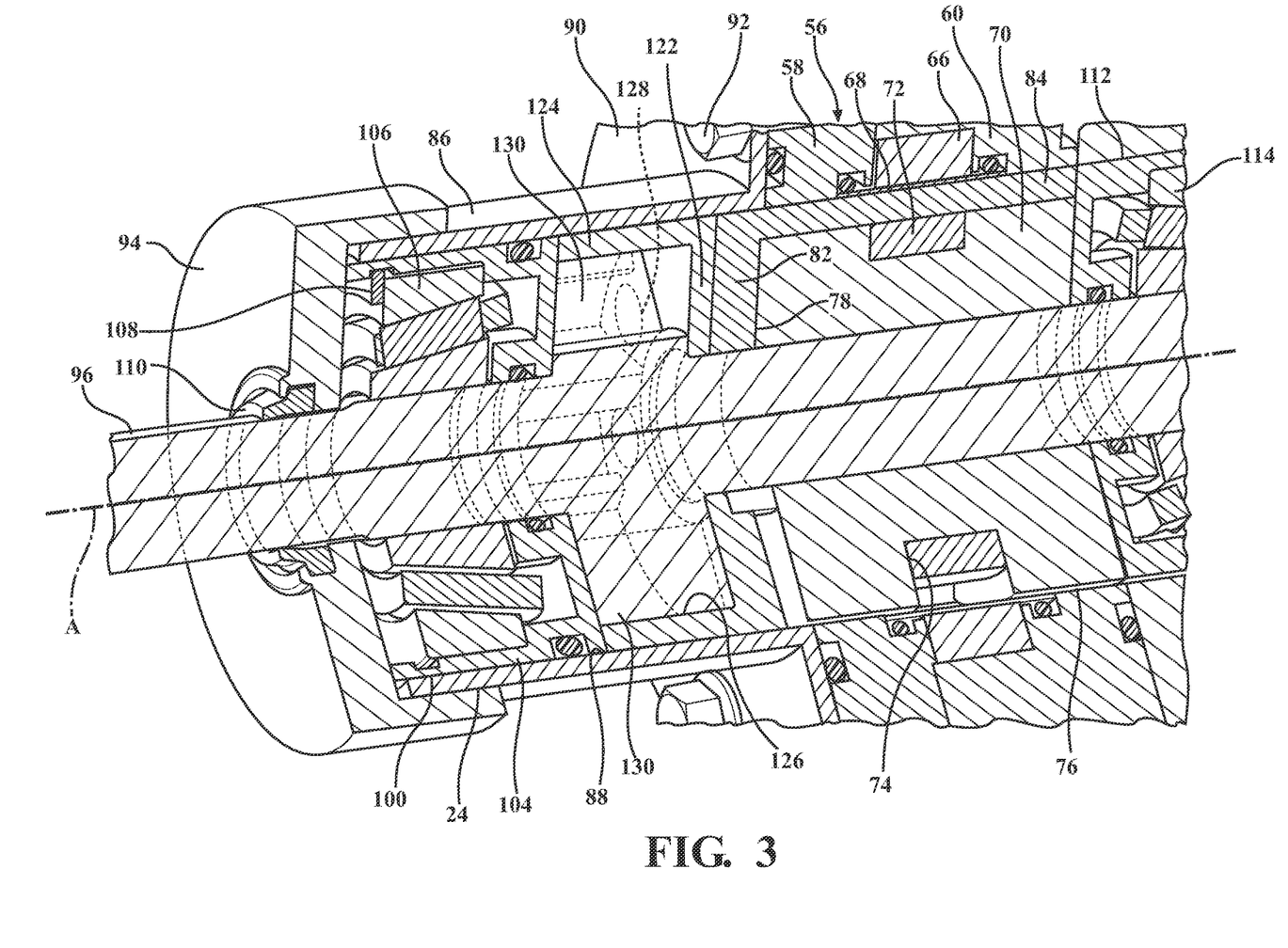
FIG. 3 is an enlarged cross-sectional view of an upper bearing member of the rotary damper assembly.

According to an embodiment of the present invention, the upper bearing member 100 includes an upper casing 104, having a generally cylindrical shape, located in the compartment 88 and adjacent to the cap 94. The upper casing 104, radially spaced apart from the shaft 96, extends annularly about the shaft 96. An upper bearing 106, having a generally circular shape, is located between the shaft 96 and the upper casing 104 extending annularly about the shaft 96 to provide support to the shaft 96. A retainer 108, located adjacent to the cap 94, couples to the upper casing 104 extending annularly about the center axis A to secure the upper bearing 106 in the upper casing 104. A seal ring 110, disposed between the cap 94 and the shaft 96, extends annularly about the center axis A to seal off environmental contaminants from entering into the upper bearing 106. The upper casing 104 containing an upper shift seal 140 and an upper casing seal 141 and prevent leakage of the magnetorheological fluid into the upper bearing 106.

The lower bearing member 102 includes a lower casing 112, having a generally cylindrical shape and located in the upper chamber 32 of the lower portion 26 of the housing 22, extending annularly about the distal end 98 of the shaft 96. A lower bearing 114, having a generally circular shape and located between the distal end 98 of the shaft 96 and the lower casing 112, extending annularly about the shaft 96 to provide support to the shaft 96. A cover 116, having a generally circular shape and axially spaced from the distal end 98 of the shaft 96, couples to the lower casing 112 for preventing the lower bearing 114 from falling out of the lower casing 112. A clip ring 118, located between the cover 116 and the projection 54, couples to the lower casing 112 extending annularly about the center axis A to secure the lower bearing 114 and the cover 116 in the lower casing 112. The lower casing 112 containing a lower shift seal 142 and the cover 116 containing a lower casing seal 143 together prevent leakage of the magnetorheological fluid into the lower bearing 114.

Figure 4:
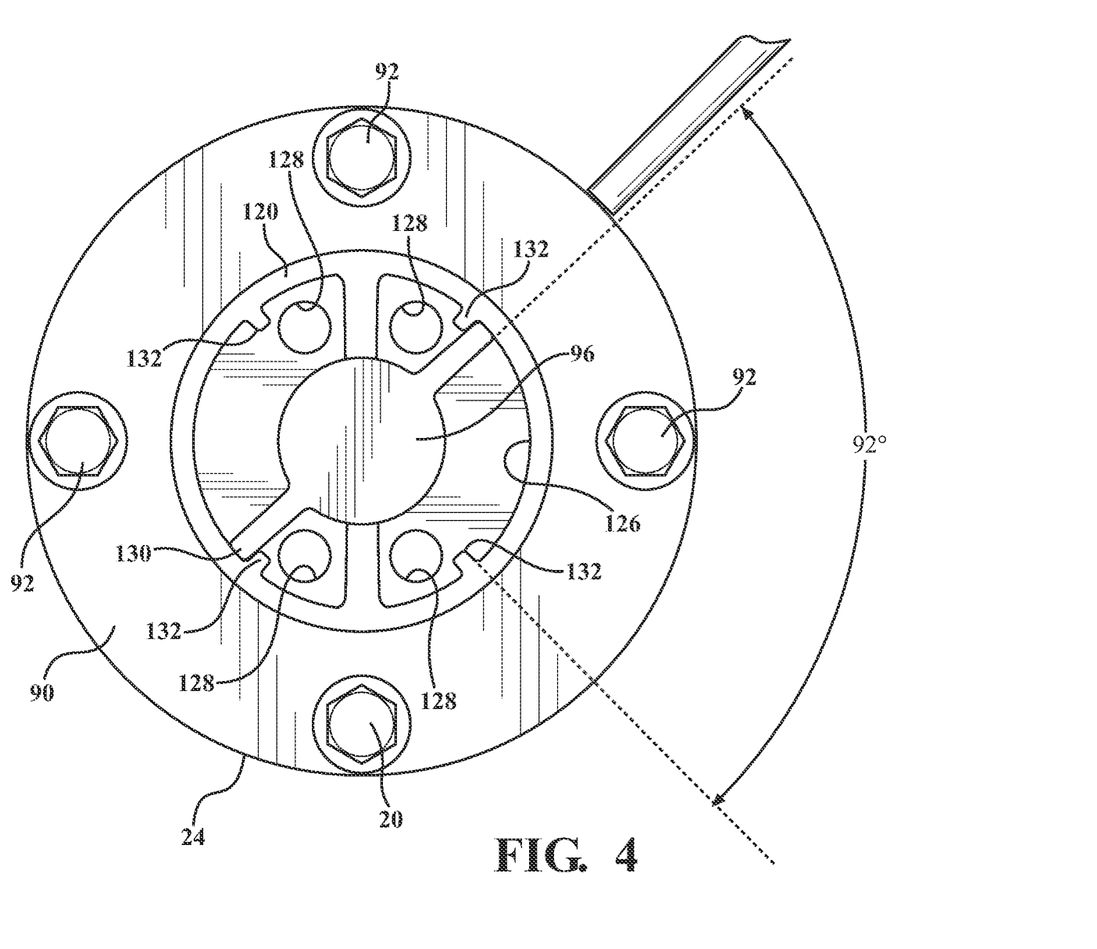
FIG. 4 is a top view of a container including a shaft of the rotary damper assembly.

As best shown in FIGS. 3 and 4, a container 120, having a generally cylindrical shape and located in the compartment 88, is sandwiched between the flow divider 78 and the upper bearing member 100 for receiving the magnetorheological fluid. The container 120 has a base 122 and a wall 124. The base 122, having a generally circular shape, is disposed adjacent to the flow divider 78 and coupled to the shaft 96. The base 122 extends radially outwardly from the shaft 96 toward the bushing 86 of the upper portion 24 of the housing 22. The wall 124, located in the compartment 88 and adjacent to the bushing 86, extends outwardly from the base 122 toward the upper bearing member 100 and annularly about the center axis A. The base 122, the wall 124, and the shaft 96 collectively define a cavity 126 between the base 122, the wall 124, and the shaft 96 and extending annularly about the center axis A. The base 122 defines a plurality of apertures 128, e.g. four apertures 128, located about the center axis A and circumferentially spaced from one another wherein each aperture 128 of the plurality of apertures 128 is in fluid communication with a passage 80 of the plurality of passages 80. According to an embodiment of the present invention, the plurality of apertures 128 includes a plurality of four apertures 128 spaced apart from one another. A pair of fluid paddles 130, located in the cavity 126, extend radially outwardly from the shaft 96, diametrically opposed to one another, toward the wall 124 for facilitating with magnetorheological fluid flow from the cavity 126 to the plurality of passages 80. According to one embodiment of the present invention, the wall 124 includes a lip 132, located adjacent to each aperture 128 of the plurality of apertures 128, extending radially inwardly toward the center axis A for engaging the fluid 130 paddles to limit rotational movement of the shaft 96.

In operation, as the shaft 96 rotates in the cavity 126, the fluid paddles 130 direct the flow of the magnetorheological fluid from the cavity 126 to the fluid chamber 32, 34 through the plurality of aperture 128 and the plurality of passages 80. As the magnetorheological fluid flows through the passages 80, the viscosity of the magnetorheological fluid changes based on the different modes of operation. In the soft mode, a specific level of current is applied to the at least one coil 66 to counter act the magnetic flux of the insert 72. In other words, in the soft mode, the at least one coil 66 produces a counter magnetic flux to cancel the magnetic flux of the insert 72, thereby allowing the magnetorheological fluid to flow freely in the rotary damper assembly 20 to provide a "soft" damping feel. In the hard mode, a large amount of current is supplied to the at least one coil 66. Accordingly, once a maximum current is reached, the controller switches the direction of electric current to combine the magnetic flux generated by the at least one coil 66 and the magnetic flux of the insert 72 thereby increasing the viscosity of the magnetorheological fluid to provide a "hard" damping feel. Throughout the operation, as the magnetorheological fluid moves through the passages 80, the temperature of the magnetorheological fluid increases which causes the volume of magnetorheological fluid to expand. The pressurized gas and the gas cup 36 accommodates for the expansion of the magnetorheological fluid thereby preventing cavitation caused by the magnetorheological fluid expansion.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A rotary damper assembly comprising:
a housing extending along a center axis and including an upper portion and a lower portion, said lower portion defining a fluid chamber for containing a magnetorheological fluid and said upper portion defining a compartment in communication with said fluid chamber;
a magnetic field generator including a magnetic core and located between said upper portion and said lower portion, said magnetic core extending along said center axis between said upper portion and said lower portion;
at least one coil extending about said magnetic core; and
a shaft extending along said center axis through said upper portion and said magnetic core and into said fluid chamber to facilitate magnetorheological fluid flow from said compartment to said fluid chamber;
wherein said magnetic field generator includes an insert, containing a permanent magnetic material, for generating a permanent magnetic field to change viscosity of the magnetorheological fluid; and
wherein said at least one coil and said insert are radially spaced apart from one another.

2. The rotary damper assembly as set forth in claim 1, wherein said magnetic field generator includes an outer body extending about said center axis, said outer body defining a hole for receiving said magnetic core; and
wherein said outer body defines a groove extending about said center axis for receiving said at least one coil.

3. The rotary damper assembly as set forth in claim 1, wherein said magnetic core defines a recess for receiving said insert.

4. The rotary damper assembly as set forth in claim 3, wherein said recess and said insert extend annularly about said center axis.

5. The rotary damper assembly as set forth in claim 4, wherein said magnetic core defines a plurality of channels with said recess extending annularly about said center axis and said plurality of channels, circumferentially spaced apart from one another, extending along said magnetic core perpendicular to said recess.

6. The rotary damper assembly as set forth in claim 5, further including a flow divider coupled to said magnetic core to define a plurality of passages.

7. The rotary damper assembly as set forth in claim 6, wherein said flow divider includes a main body and a plurality of protrusions, said main body being located on said magnetic core adjacent to said upper portion; and
each protrusion of said plurality of protrusions, spaced apart from one another and received in a channel of said plurality of channels, extending along said center axis to establish said plurality of passages located about said magnetic core.

8. The rotary damper assembly as set forth in claim 7, further including a container located in said compartment and adjacent to said magnetic core;
wherein said container includes a base and a wall, said base, said wall, and said shaft collectively define a cavity extending annularly about said center axis.

9. The rotary damper assembly as set forth in claim 8, wherein said base defines a plurality of apertures, located about said center axis and circumferentially spaced from one another; and
wherein each aperture of said plurality of apertures is in fluid communication with a passage of said plurality of passages.

10. The rotary damper assembly as set forth in claim 9, further including a pair of fluid paddles, located in said cavity, for facilitating with magnetorheological fluid flow from said cavity to said plurality of passages.

11. The rotary damper assembly as set forth in claim 10, wherein said pair of fluid paddles extend radially outwardly from said shaft, diametrically opposed to one another, toward said wall.

12. The rotary damper assembly as set forth in claim 1, further including a pair of bearing members including an upper bearing member and a lower bearing member to provide support to said shaft.

13. The rotary damper assembly as set forth in claim 12, wherein said upper bearing member is located in said compartment, extending about said shaft; and
said lower bearing member is located in said fluid chamber extending about a distal end of said shaft.

14. The rotary damper assembly as set forth in claim 1, further including a gas cup located in said fluid chamber dividing said fluid chamber into an upper chamber and a lower chamber to accommodate for the expansion of the magnetorheological fluid.

15. The rotary damper assembly according to claim 14, further including an end plate coupled to a first end of said lower portion of said housing; and
- a charge valve, located on said end plate, for allowing a user to introduce a gas into said lower chamber between said gas cup and said end plate.

16. A rotary damper assembly comprising:
- a housing extending along a center axis and including an upper portion and a lower portion, said lower portion defining a fluid chamber for containing a magnetorheological fluid and said upper portion defining a compartment in communication with said fluid chamber;
- a magnetic field generator including a magnetic core located between said upper portion and said lower portion, said magnetic core extending along said center axis between said upper portion and said lower portion;
- at least one coil extending about said magnetic core;
- a shaft extending along said center axis through said upper portion and said magnetic core and into said fluid chamber to facilitate magnetorheological fluid flow from said compartment to said fluid chamber;
- a gas cup located in said fluid chamber dividing said fluid chamber into an upper chamber and a lower chamber to accommodate for the expansion of the magnetorheological fluid;
- an end plate coupled to a first end of said lower portion of said housing; and
- a charge valve, located on said end plate, for allowing a user to introduce a gas into said lower chamber between said gas cup and said end plate.

17. The rotary damper assembly according to claim 16, wherein said magnetic field generator includes an insert, containing a permanent magnetic material, for generating a permanent magnetic field to change viscosity of the magnetorheological fluid; and
- said at least one coil and said insert being radially spaced apart from one another.

18. A rotary damper assembly comprising:
- a housing extending along a center axis and including an upper portion and a lower portion, said lower portion defining a fluid chamber for containing a magnetorheological fluid and said upper portion defining a compartment in communication with said fluid chamber;
- a magnetic field generator including a magnetic core and located between said upper portion and said lower portion, said magnetic core extending along said center axis between said upper portion and said lower portion;
- at least one coil extending about said magnetic core; and
- a shaft extending along said center axis through said upper portion and said magnetic core and into said fluid chamber to facilitate magnetorheological fluid flow from said compartment to said fluid chamber;
- wherein said magnetic field generator includes an insert, containing a permanent magnetic material, for generating a permanent magnetic field to change viscosity of the magnetorheological fluid;
- wherein said magnetic field generator includes an outer body extending about said center axis, said outer body defining a hole for receiving said magnetic core; and
- wherein said outer body defines a groove extending about said center axis for receiving said at least one coil.

* * * * *